3,326,763
REAGENT FOR INCREASING ACTIVITY
OF INSULIN
Harry N. Antoniades, Newton, Mass., assignor to Protein Foundation, Incorporated, Cambridge, Mass., a corporation of Massachusetts
No Drawing. Filed Jan. 8, 1962, Ser. No. 165,985
8 Claims. (Cl. 167—74)

This invention relates to material having insulin-like biological activity and more particularly to the preparation, from insulin-containing materials whose insulin-like biological activity is suppressed by complexing of the contained insulin with protein, of materials exhibiting substantially increased insulin-like biological activity, through the action of novel chemical reagents which can cause dissociation of said complexes.

Studies have revealed that, although certain human fluids and tissues, such as human blood and the tissues of the pancreas, contain insulin, they exhibit such little insulin-like activity as to require the conclusion that in vivo much of the activity is held, in the blood, by a carrier protein and, in the tissue, in some form of complex with the same or a similar protein. In any event, insulin-protein complexes eluted from cationic exchange resins with which whole blood or serum or homogenized pancreas tissue have been mixed in the manner described in volume 103, pages 667–679, of the Proceedings of the Society for Experimental Biology and Medicine (1960), are biologically relatively inactive when tested for insulin activity with standard methods. Crystalline insulin when dissolved in the presence of human albumin or insulin–$I^{131}$ when added in vitro to blood serum or when taken from a human donor after intravenous injection was not adsorbed on the resin under the same conditions, thereby demonstrating that the resin-held insulin is in such different form from crystalline or other free insulin having full biological activity, that it possesses less biological activity than the crystalline and insulin–$I^{131}$ forms.

Objects of this invention are accordingly to prepare, from insulin-containing proteinaceous materials, products that have greater insulin-like biological activity by dissociating complexes of the insulin with protein in such materials under physiological conditions, and to prepare and provide a chemical reagent active under physiological conditions to cause dissociation of insulin-protein complexes such as are present in normal or diabetic human blood and pancreas, thereby to develop greater insulin activity than is exhibited by said complexes.

In accordance with this invention, such a reagent comprises all or part of the water-solubles present in certain animal, including human, tissues, extracted therefrom in crude or purified form. Extracts from human, bovine, rat (epididymal) and rabbit (perirenal) adipose tissue, when properly prepared, have been found to contain such an enzyme reagent. The extractions are carried out with the use of physiological saline or other salt solutions at relatively low temperatures.

A typical example is as follows:

Rat adipose tissue extract was obtained by homogenizing epididymal adipose tissue of male rats (weighing 80 to 120 gm.) with 0.15 molar sodium chloride or Gey and Gey bicarbonate buffer. The epididymal adipose tissue prior to extraction was kept frozen at $-20°$ C. Two to five grams of the frozen tissue were homogenized in a Teflon tissue grinder with 10 to 20 ml. of cold 0.15 molar sodium chloride or Gey and Gey bicarbonate buffer (American Journal of Cancer vol. 27, pp. 45, 55, 1936.) at $2°$ C. The homogenate was centrifuged at 3,000 r.p.m. at $2°$ C. for 30 minutes, and the fat-free fluid portion of the homogenate was collected. When necessary, the centrifugation was repeated in order to remove the fat contaminating the tissue extract. The adipose tissue extract was frozen and stored at $-20°$ C. Human, bovine and rabbit adipose tissue extracts (mesenteric fat) were obtained with Gey and Gey bicarbonate buffer with a method similar to that employed for the preparation of the rat adipose tissue extract.

Partially purified human, bovine, rabbit and rat adipose tissue extracts may be obtained by cold ethanol precipitation. 10 to 20 ml. of the crude extract is brought to 60% ethanol concentration at $-5°$ C. under continuous stirring with the use of 95% ethanol at pH $7.2\pm0.2$. The mixture may be stored at $-5°$ C. overnight, and the precipitate then removed by centrifugation at $-5°$ C. at 3,000 r.p.m. for 30 minutes. The supernatant fluid is either diluted with cold distilled water in order to bring the ethanol concentration to 4–6%, and then lyophilized from the frozen state; or is brought to 2 volumes of acetone, at $-5°$ C. and the precipitate containing the enzyme is separated by centrifugation at $-5°$ C. and then lyophilized from the frozen state. In either case the dried material is dissolved with sufficient cold distilled water to obtain the desired volume, e.g., that of the original volume of the crude extract employed for the purification. The purified extract is stored at $-20°$ C.

Lyophilized resin eluates prepared as described in the heretofore cited publication and derived from pancreatic tissue or derived from blood sera was dissolved in Gey and Gey bicarbonate buffer (15 mg. of resin eluate per ml. buffer) and dialzed against ten volumes of the same buffer. Part of the solution containing the insulin complexes was assayed for insulin activity without the presence of adipose tissue extract; and another part of the same solution was assayed for insulin-like activity in the presence of adipose tissue extract in an amount of between 0.5–1.0 ml. of extract per 10 ml. of eluate. The insulin complexes incubated with the adipose tissue extract exhibited a many fold increase of insulin activity as compared with the control solution of insulin complexes.

Increase in activity is directly related to the concentration of the tissue extract present, it having been ascertained that 1.8 $\mu$g. of extract nitrogen per ml. of eluate is adequate.

When 0.5–1.0 ml. of rabbit adipose tissue extract containing 18.0 $\mu$g. of nitrogen is added to 10 ml. of whole serum diluted with Krebs bicarbonate buffer, total insulin-like activity as measured by standard tests, revealed marked increase in insulin-like activity over that of the diluted serum.

It has also been demonstrated that adipose tissue extracts when added to crystalline insulin do not alter the degree of insulin-like activity of the crystalline insulin.

Crude adipose tissue extracts, stored at $5°$ C. for 18 hours or heated at $100°$ C. for 1 hour, show loss of activity, probably due to proteolytic enzymes or bacteria present in the extract. However, by partially purifying the extract as discussed in the ethanol extraction described above, stability appears to be obtained for, even after 18 hrs. storage at $5°$ C., no activity appeared to have been lost.

The standard methods of determining insulin-like activity may be rat adipose tissue assay or rat diaphragm tissue assay as referred to and described in detail at volume 69, No. 1, July 1961 issue of Endocrinology, pages 46–54.

What is claimed is:
1. A reagent useful for increasing the insulin-like biological activity of insulin-containing proteinaceous materials which have their insulin-like biological activity suppressed at least in part by complexing of the insulin present with protein, comprising a nitrogen-containing extract resulting from homogenizing frozen normal animal adipose tissue with a salt solution selected from the group consisting of about 0.15 molar sodium chloride and Gey and Gey buffer, at about 2° C., separating out and discarding the fatty and other insolubles of the homogenate, adding 95% ethanol to the solution to produce an ethanol concentration of about 60% at −5° at pH of about 7.2, and separating out and discarding further insolubles.

2. A reagent as claimed in claim 1 wherein, in the process of preparation, after separating out the further insolubles the material is lyophilized from the frozen state, said lyophilized reagent being relatively stable at 5° C., for a period of at least 18 hours.

3. The reagent claimed in claim 2 dispersed in aqueous solution in an amount to provide 18 to 36 micrograms of nitrogen per milliliter of solution.

4. A reagent as claimed in claim 1 wherein in the process of preparation, after separating out the further insolubles, acetone is added to the solution at about −5° C. to precipitate material insoluble in the acetone-ethanol mixture and the precipitate containing the reagent is separated from the remaining solution and the precipitate is then lyophilized from the frozen state.

5. The reagent claimed in claim 4 dispersed in aqueous solution in an amount to provide 18 to 36 micrograms of nitrogen per milliliter of solution.

6. The method of increasing the insulin-like biological activity of insulin-containing proteinaceous material which have their insulin-like biological activity suppressed at least in part by complexing of the insulin present with protein, comprising incubating the proteinaceous material with the product claimed in claim 1.

7. The method of increasing the insulin-like biological activity of insulin-containing proteinaceous material which have their insulin-like biological activity suppressed at least in part by complexing of the insulin present with protein, comprising incubating the proteinaceous material with the product claimed in claim 3.

8. The method of increasing the insulin-like biological activity of insulin-containing proteinaceous material which have their insulin-like biological activity suppressed at least in part by complexing of the insulin present with protein, comprising incubating the proteinaceous material with the product claimed in claim 5.

References Cited

Antoniades: Endocrinology, volume 68, No. 1, January 1961, pages 7–16.

ALBERT T. MEYERS, *Primary Examiner.*

SAM ROSEN, JULIUS S. LEVITT, FRANK CACCIAPAGLIA, Jr., LEWIS GOTTS, *Examiners.*

E. FRANK, *Assistant Examiner.*